US011762984B1

(12) United States Patent
Roth et al.

(10) Patent No.: US 11,762,984 B1
(45) Date of Patent: *Sep. 19, 2023

(54) INBOUND LINK HANDLING (71) Applicant: Amazon Technologies, Inc., Seattle, WA (US)

(72) Inventors: Gregory Branchek Roth, Seattle, WA (US); Matthew Daniel DeMoss, Falls Church, VA (US); Jonathan Matthew Miller, Burke, VA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/601,807

(22) Filed: Oct. 15, 2019

Related U.S. Application Data (63) Continuation of application No. 14/498,870, filed on Sep. 26, 2014, now Pat. No. 10,452,837.

(51) Int. Cl.
| | |
|---|---|
| G06F 21/53 | (2013.01) |
| G06F 21/55 | (2013.01) |
| H04L 9/40 | (2022.01) |
| G06F 21/57 | (2013.01) |
| G06F 21/62 | (2013.01) |
| G06F 21/56 | (2013.01) |

(52) U.S. Cl.
CPC ............ *G06F 21/53* (2013.01); *G06F 21/552* (2013.01); *G06F 21/56* (2013.01); *G06F 21/577* (2013.01); *G06F 21/62* (2013.01); *H04L 63/1441* (2013.01)

(58) Field of Classification Search
CPC ..... G06F 21/50–568; G06F 21/62–629; H04L 63/14–1491
See application file for complete search history.

(56) References Cited

U.S. PATENT DOCUMENTS

| | | | |
|---|---|---|---|
| 8,001,610 B1 | 8/2011 | Chickering et al. | |
| 8,707,251 B2 | 4/2014 | Amir et al. | |
| 9,104,837 B1* | 8/2015 | Khajuria | G06F 21/00 |
| 9,118,712 B2* | 8/2015 | McCoy | H04L 63/1441 |
| 9,391,832 B1* | 7/2016 | Song | G06F 12/1408 |
| 2004/0006706 A1 | 1/2004 | Erlingsson | |
| 2011/0022559 A1* | 1/2011 | Andersen | H04L 63/1483 706/47 |
| 2011/0099609 A1 | 4/2011 | Malhotra et al. | |
| 2011/0314546 A1* | 12/2011 | Aziz | G06F 21/562 726/24 |
| 2013/0179574 A1 | 7/2013 | Calder et al. | |

(Continued)

OTHER PUBLICATIONS

U.S. Appl. No. 13/316,309, filed Dec. 9, 2011, Taylor et al.

*Primary Examiner* — Madhuri R Herzog (74) *Attorney, Agent, or Firm* — BakerHostetler (57) ABSTRACT

A support service application may process a request that contains a hyperlink. The hyperlink may be examined to determine a level of risk associated with accessing a resource referred to by the hyperlink. An execution environment for processing the hyperlink may be identified. The execution environment may comprise a virtual machine drawn from a pool of virtual machines. The resource may be retrieved by a browser process operating within the context of the virtual machine, and a safe version of the resource may be rendered and made available to customer support personnel using the support service application.

20 Claims, 8 Drawing Sheets

(56) References Cited

U.S. PATENT DOCUMENTS

| | | |
|---|---|---|
| 2013/0246901 A1 | 9/2013 | Massand |
| 2014/0165118 A1 | 6/2014 | Garcia Mendoza et al. |
| 2014/0283071 A1* | 9/2014 | Spikes ................ H04L 63/1441 |
| | | 726/23 |
| 2015/0101068 A1 | 4/2015 | Evans et al. |
| 2015/0261951 A1 | 9/2015 | Abuelsaad et al. |
| 2015/0315008 A1 | 11/2015 | Locke et al. |
| 2016/0019597 A1 | 1/2016 | Smith |
| 2016/0267272 A1* | 9/2016 | Born .................... G06F 21/566 |

* cited by examiner

INBOUND LINK HANDLING

BACKGROUND

The present application is a continuation of U.S. patent application Ser. No. 14/498,870, entitled "INBOUND LINK HANDLING", filed Sep. 26, 2014, the contents of which are incorporated herein by reference in its entirety.

The provision of customer support in a cloud-based environment may involve the assemblage of information from a wide variety of sources, including the Internet. A customer might, for example, submit a description of a problem along with various hyperlinks referring to various Internet locations that are associated with the problem the customer hopes to have resolved. However, while the information referred to by the hyperlink might be useful to a customer service representative, it might also be the case that the hyperlink refers to an unsafe destination or resource, such as a virus.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

A provider of cloud-based computing services may provide various support services to its customers. These services may, in general terms, be described as involving the resolution of various problems and issues that might be encountered by a customer. Upon noticing an issue, a customer might file a customer service request that contains various forms of information that help to describe the issue that the customer is encountering. This information might include various hyperlinks that refer to additional information related to the issue. This type of information may be referred to herein as a resource associated with a hyperlink.

There may, however, be various issues related to the retrieval of resources associated with a hyperlink. A hyperlink may under various circumstances be considered unsafe, in that it may refer, for example, to a web page that contains a virus, Trojan horse, or other form of malware. In some cases, the malware may specifically target the cloud-based provider. This type of attack might attempt to leverage the resources available to various systems that may be involved in processing customer service requests. These systems might, for example, have access to sensitive customer information. A targeted attack might involve submitting a customer service request that contains a hyperlink referring to malware designed to attempt to extract that information.

Embodiments of the present disclosure may be employed, in various systems and methods, in conjunction with a customer service application that processes customer service requests or other types of support service requests. The terms customer service and support service may be used interchangeably. Moreover, the various techniques and mechanisms described herein may be applied in a wide variety of circumstances, such as those where access to potentially unsafe hyperlinks is desired, but risky due to various factors of the computing environment.

Support service requests may contain potentially unsafe hyperlinks. For example, in an embodiment a system might receive data indicative of responding to a support service request, where the data comprises a hyperlink that ostensibly refers to a resource useful to a support service representative. The hyperlink may, however, be unsafe. Embodiments may determine to process the hyperlink in an isolated environment, based at least in part on an estimated level of risk associated with accessing the resource by processing the hyperlink. The isolated environment may comprise an instance of a virtual machine and a browser process that operates in the context of the virtual machine instance. The virtual machine instance may be configured to have a minimized set of access controls as compared to the support service application. Access controls may include access rights, security controls, security policies, and so forth. Access controls refers to these and other factors that, individually or as a whole, control the ability of a process or other executing code to access or inspect computing resources. The hyperlinked resource may be retrieved using the virtual machine instance and browser process. The resource may then be rendered into a version of the resource that is considered to be safe for use in the context of the support service application. The version of the resource that is rendered may be based on an estimated level of risk that is associated with using the resource in the context of the support service application. A level of risk may be evaluated through a variety of factors. These include various factors that may be obtained prior to obtaining the resource, such as the domain to which the hyperlink refers or any content in which the hyperlink was embedded. For example, a support service request might originate in an email. The presence of certain keywords, poor grammar, and so on, may be indicative of a high level of risk. Signatures or other identifying characteristics, such as hashes, of the email might be used to identify a level of risk. Embodiments may also maintain a database or other information repository containing information about risk levels associated with hyperlinks or the resources to which they refer. The information may be based on downloaded virus signatures, monitoring of previous attempts to access the resource, manual investigation, and so on.

Figure 1:
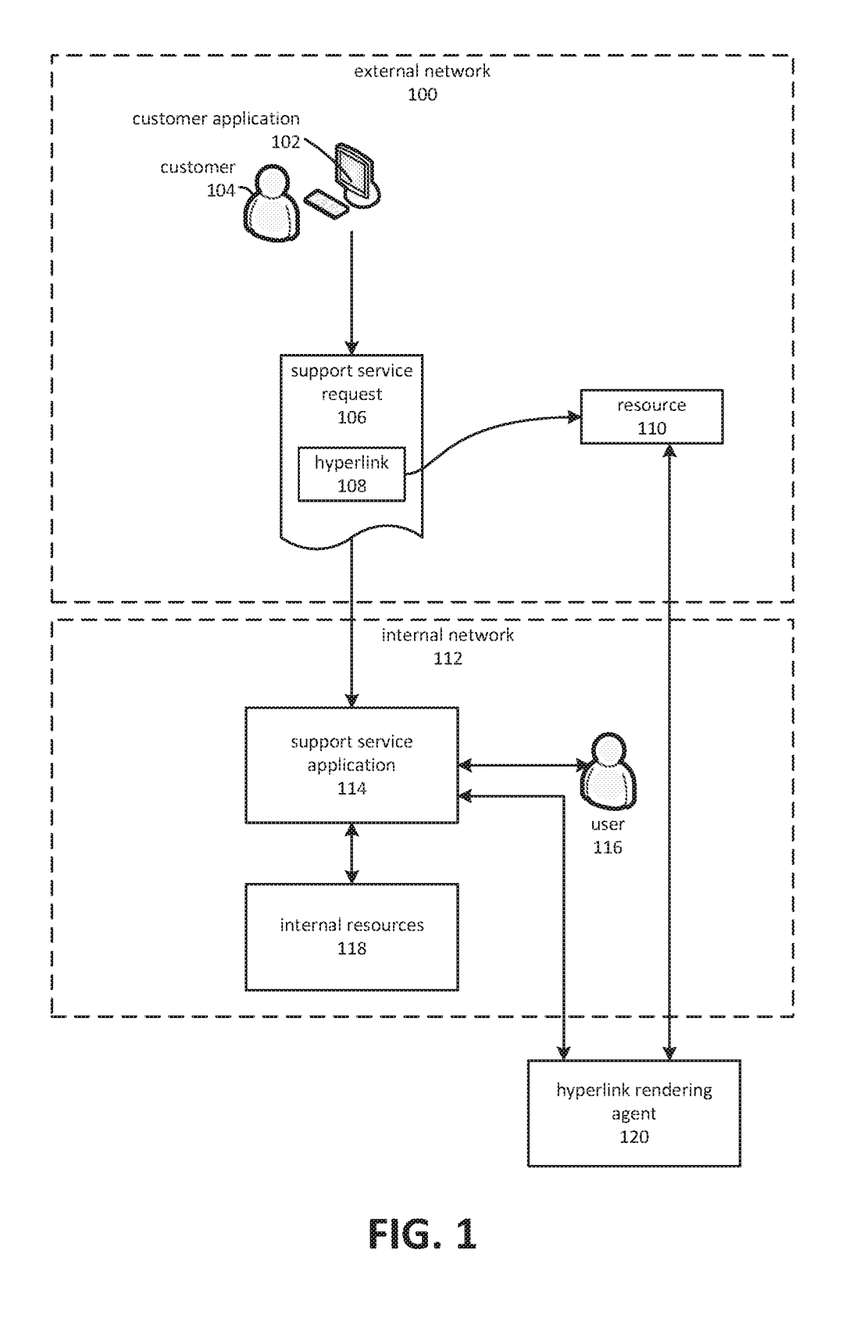
FIG. 1 is a block diagram depicting an embodiment of a system for handling potentially unsafe inbound hyperlinks.

FIG. 1 is a block diagram depicting an embodiment of a system for handling potentially unsafe inbound hyperlinks. A system for handling potentially unsafe inbound hyperlinks may comprise a support service application 114 that may receive a support service request 106 from a customer application 102, which may be used by customer 104. This configuration is intended to be illustrative, and should not be construed as limiting the scope of the present disclosure. There may, for example, be numerous mechanisms by which various executing processes receive data that comprises a potentially unsafe hyperlink.

As used herein, the term hyperlink may include any of various types of references to resources such as web pages, web service application programming interfaces ("APIs"), files, scripts, and so on. A hyperlink may include information that refers to a resource, specifies a resource, is usable to access a resource, or that may cause a resource to be accessed automatically or upon a future interaction. This may include metadata, such as tags indicating that a resource should be automatically loaded, or various forms of embedded instructions such as script code that may cause a resource to be accessed. The term resource, as used herein, may refer to any of the resource types just described, as well as many other resource types. For example, in FIG. 1 hyperlink 108 may be a uniform resource locator ("URL") referring to resource 110, which might be a downloadable file. The resource 110 that is associated with hyperlink 108 may be accessible through external network 100. An external network 100 might include the Internet, a local area network that is not known to internal network 112, or a network that is not trusted by internal network 112 for any of a variety of reasons.

A support service application 114 may operate on internal network 112. Other embodiments may include other types of applications, processes, libraries, modules, and so forth. The depiction of support service application 114 in FIG. 1 is intended to be illustrative, and should not be viewed as limiting the scope of the present disclosure. A user 116 may interact with support service application 114 in order to respond to support service request 106. It may be the case that in order to respond to support service request 106, user 116 may need access to resource 110 referred to by hyperlink 108 in support service request 106.

An internet network 112 may include various types of networks or other mechanisms for interconnections among computing devices. In general terms, internal network 112 may refer to an interconnection between support service application 114 and other resources or computing devices. Applications operating on internal network 112 may have access to various internal resources 118. These may include resources that are sensitive or privileged in some way. It may be the case that support service application 114 utilizes this information by accessing it via internal network 112. However, because internal resources 118 may contain sensitive or privileged information, embodiments may be configured to prevent situations in which malicious code may be allowed access to internal resources 118.

A hyperlink rendering agent 120 may obtain hyperlinks from support service application 114 for processing on behalf of user 116. In some embodiments, various mechanisms may be employed to intercept data that may contain a hyperlink prior to receipt by an application. For example, support service request 106 might be intercepted and forwarded to hyperlink rendering agent 120 prior to processing of support service request 106 by support service application 114. In other embodiments, support service application 114 may be configured to forward hyperlinks to hyperlink rendering agent 120. Embodiments of support service application 114 may do this in anticipation of user 116 accessing support service request 106 (or in other words, before user 116 begins to respond to support service request 106). In this manner, delays encountered by user 116 related to obtaining access to a version of resource 110 may be reduced or eliminated.

In an embodiment, a hyperlink rendering agent 120 may comprise an instance of a virtual machine configured to have access to less than the full set of internal resources 118 that is available to other processes operating within internal network 112. For example, components of support service application 114 may have access to various databases accessible through internal network 112, while a virtual machine forming part of hyperlink rendering agent 120 might not have access to those databases. In an embodiment, a virtual machine comprising part of hyperlink rendering agent 120 might be provided with access to the Internet and to a whitelisted subset of addresses on internal network 112. Additional protective measures might also be utilized, such as ports closed via firewalls. In another embodiment, a virtual machine comprising part of hyperlink rendering agent 120 may be provided with network access that is limited to a domain associated with hyperlink 108.

In various embodiments, hyperlink rendering agent 120 may also comprise one or more processes executing within a virtual machine. These processes may act as servers for requests to process hyperlinks. For example, a "browser" server operating on a virtual machine may receive a request to process hyperlink 108 on behalf of user 116.

Figure 2A:
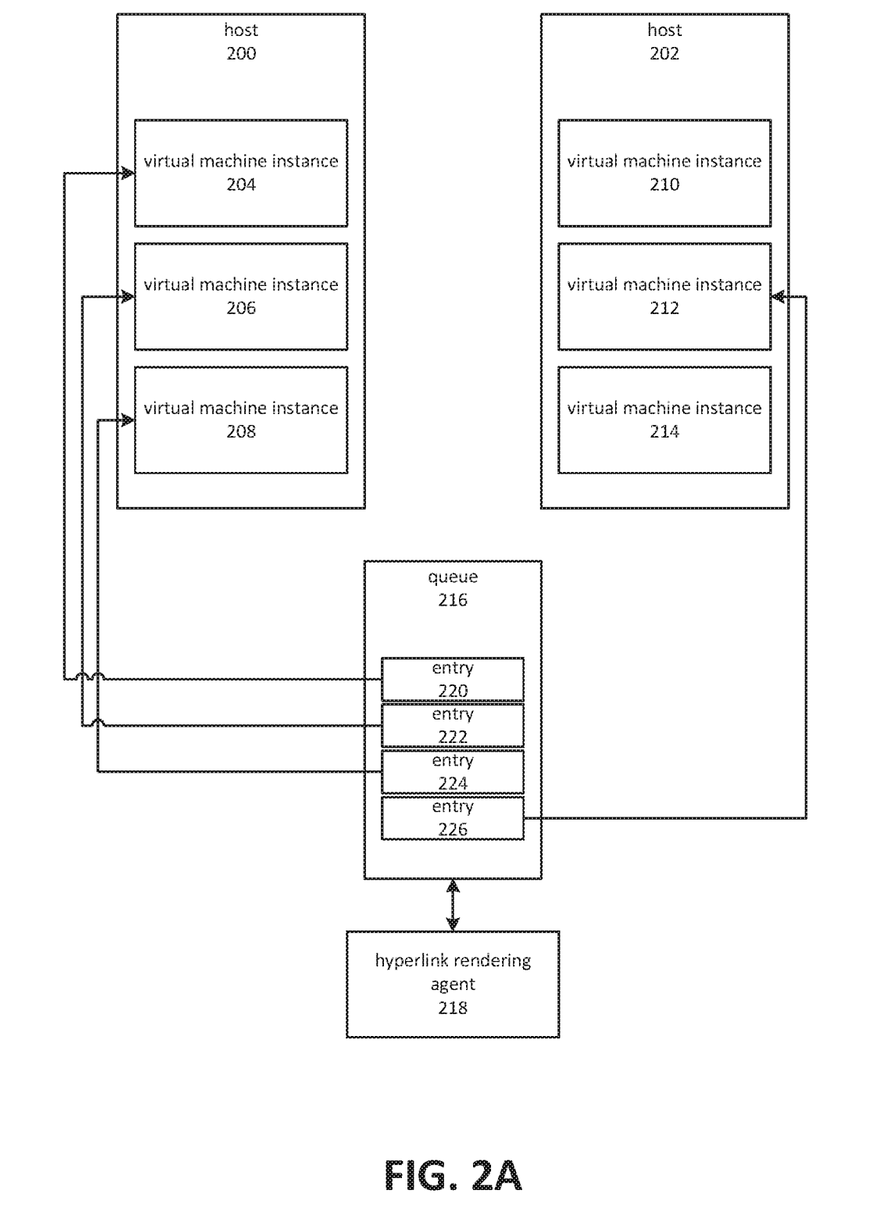
FIG. 2A is a block diagram depicting an embodiment of a system for providing safe access to resources referred to by a potentially unsafe hyperlink, in which the system comprises a queue of virtual machine instances available for processing hyperlinks.

FIG. 2A is a block diagram depicting an embodiment of a system for providing safe access to resources referred to by a potentially unsafe hyperlink, in which the system comprises a queue of virtual machine instances available for processing hyperlinks. Various applications, such as the support service application 114 depicted in FIG. 1, may transmit requests for processing a hyperlink, such as hyperlink 108, to a hyperlink rendering agent 218. In various embodiments, requests for processing hyperlinks may be queued and processed asynchronously. Embodiments may adjust availability of computing resources (such as the availability of virtual machine instances) based on current or anticipated request volume. For example, with reference to FIG. 1, embodiments may adjust the number of available virtual machine instances so that hyperlink 108 may be processed prior to user 116 interacting with support service application 114 to respond to support service request 106.

A system for processing hyperlinks, such as the example depicted in FIG. 2A, may comprise one or more computing systems for hosting virtual machine instances. In the example of FIG. 2A, host 200 is a computing device operating virtual machine instances 204-208 and host 202 is a computing device operating virtual machine instances 210-214.

A hyperlink rendering agent 218 may handle requests to process hyperlinks by interacting with queue 216 to obtain an instance of a virtual machine that is available to process hyperlinks. Queue 216 may comprise a set of entries 220-226 referring to available virtual machine instances. In the example depicted by FIG. 2, these are virtual machine instances 204, 206, 208, and 212. Other virtual machine instances, such as virtual machine instances 210 and 214, may be unavailable for reasons such as already being used to process other hyperlinks or being used for some other task. Embodiments may include a mechanism for maintaining queue 216 so that it refers to available queue instances. For example, hyperlink rendering agent 218 may cause entry 226 to be removed from queue 216 while the corresponding virtual machine instance 212 is processing a hyperlink. After completing the processing, an entry representing virtual machine instance 212 may be returned to the pool. In some embodiments, a virtual machine instance used for processing a hyperlink may be replaced by a fresh virtual machine instance, or, in other words, replaced by a virtual machine instance restored from a known state. This approach may mitigate various security issues such as preventing access to information retrieved during the processing of a first hyperlink by malicious code associated with processing a second hyperlink.

Figure 2B:
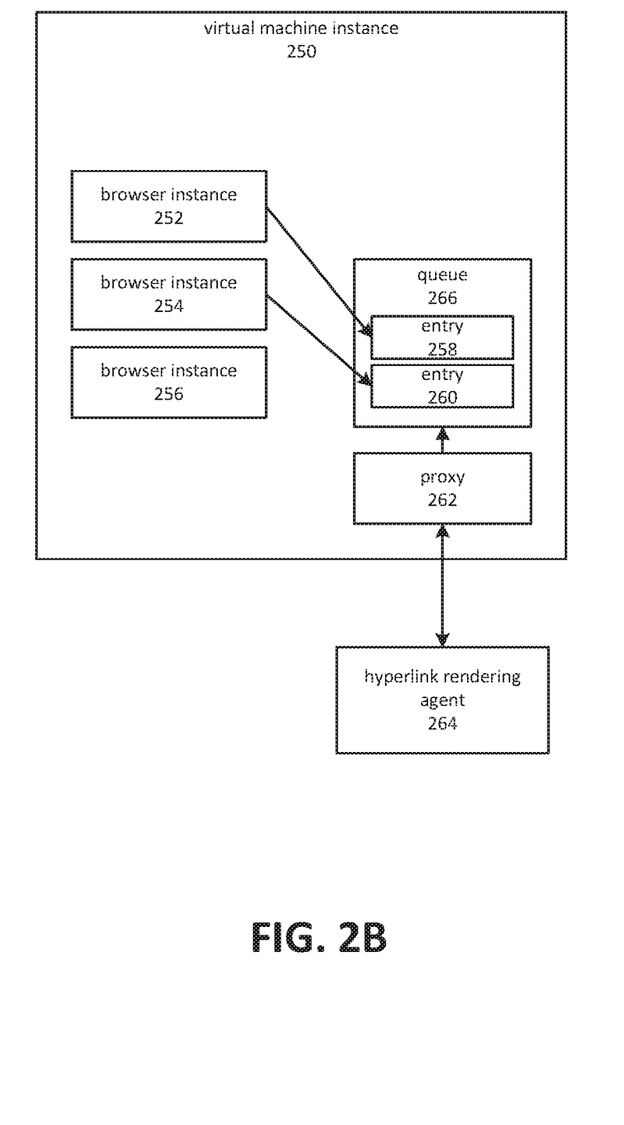
FIG. 2B is a block diagram depicting an embodiment of a virtual machine instance operating in a system for processing potentially unsafe hyperlinks.

FIG. 2B is a block diagram depicting an embodiment of a virtual machine instance operating in a system for processing potentially unsafe hyperlinks. A hyperlink rendering agent 264 may transmit requests to process a hyperlink to a proxy 262 operating on a virtual machine instance 250. In various embodiments, virtual machine instance 250 may have been obtained through a mechanism such the queue 216 depicted in FIG. 2A. A proxy 262 may comprise a process executing in the context of virtual machine instance 250 for receiving requests to process hyperlinks from hyperlink rendering agent 264. The proxy 262 may locate a browser instance for processing a hyperlink from queue 266. Browser instances 252 and 254 may be represented in queue 266 by entries 258 and 260.

As used herein, a browser instance may refer to an executing process or code module comprising computer-executable instructions for processing a hyperlink. In some embodiments, a browser instance, such as any of browser instances 252-256 may comprise a background thread without a user interface. The background thread may perform operations such as establishing a network connection to a remote server associated with a hyperlink, retrieving one or more resources from the server, and so on. In other embodiments, a browser instance, such as any of browser instances 252-256, may refer to a browser application with a user interface, including, for example, conventional web browsers. Embodiments may comprise additional mechanisms for automating interaction with the user interface, such that no actual user is involved while the hyperlink is processed. For example, in FIG. 2B browser instance 256 might be involved in processing a hyperlink by successively navigating, rendering, and capturing web pages associated with a hyperlink. Browser instance 256 might, in this case, be a browser application with a user interface. A root URL specified by the hyperlink may be rendered in the browser instance user interface, and a bitmap of that page may then be captured and stored. A simulation of a user interaction may then cause a navigation action involving a link contained on the page. The result of navigating to the linked page may then also be rendered, captured, and stored. This process might be repeated up to a fixed depth of links from the root URL. The resulting resource might then comprise an archive of the rendered and captured pages.

Figure 3:
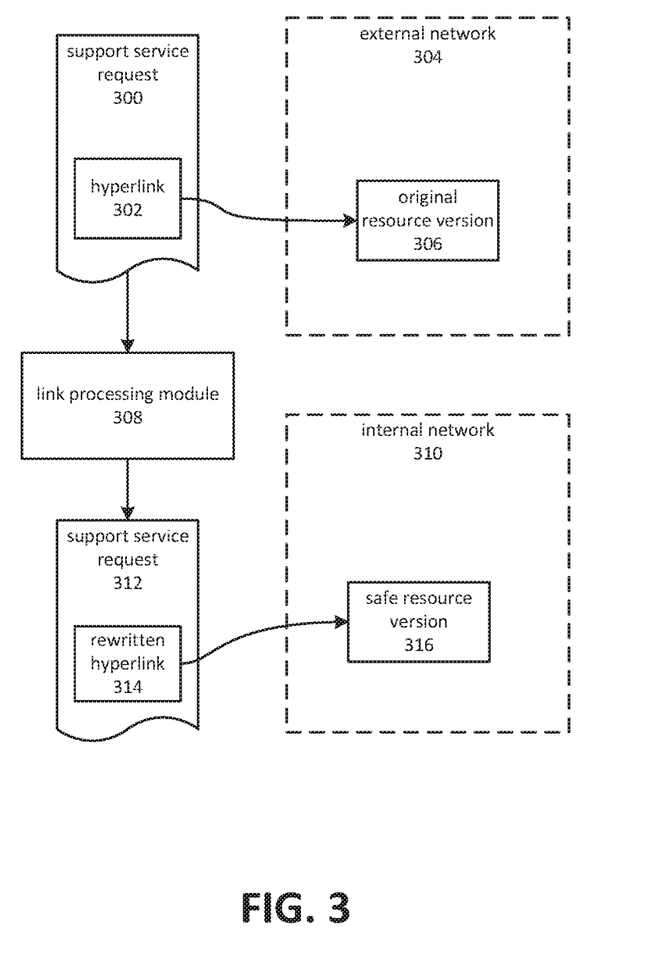
FIG. 3 is a block diagram depicting an embodiment of a process of rewriting hyperlinks and providing access to a safe version of a resource associated with a potentially unsafe hyperlink.

FIG. 3 is a block diagram depicting an embodiment of a process of rewriting hyperlinks and providing access to a safe version of a resource associated with a potentially unsafe hyperlink. In various embodiments, rewriting hyperlinks may comprise replacing hyperlinks that refer to locations on an external network with new hyperlinks that refer to locations on an internal network that contains a safely rendered version of the resource on the external network. In other various embodiments, rewriting hyperlinks may comprise replacing an original hyperlink with a rewritten version that will, when and if the rewritten link is processed, cause a safely rendered version of the external resource to be produced. FIG. 3 is intended to illustrate the former case, in which a link is rewritten to point to a safely rendered version of the remotely located resource.

A support service request 300 may contain hyperlink 302, which may be associated with an original resource version 306 located on external network 304. As described herein, a resource may refer to a wide variety of remotely located resources such as web pages, documents, web service interfaces, collections of web pages, and so forth. An external network 304 may, as described herein, refer to a potentially unsafe network, such as the Internet or an untrusted local area network.

A link processing module 308 may receive support service request 300 containing hyperlink 302 for rewriting. Embodiments may determine to perform link rewriting based on factors, such as an estimated level of risk associated with the link. For example, embodiments may identify a domain associated with hyperlink 302 and determine, based on the identified domain, that the link should be rewritten to refer to a safe version of the resource.

A hyperlink 302 identified as potentially unsafe may be processed, using mechanisms described herein, to retrieve original resource version 306 and produce safe resource version 316, which can be stored in internal network 310. This may be done, for example, using the system described in FIGS. 2A and 2B. As used herein, the term "safe version" may refer to a copy, representation, or other mechanism for supplying usable information about original resource version 306, where the information is maintained in a form that is unlikely to present security issues.

Embodiments may store safe resource version 316 on a storage device or memory accessible to the application or applications to which support service request 300 was directed. Link processing module 308 may then form rewritten hyperlink 314 referring to the location at which safe resource version 316 is stored. Support service request 312 may then be formed to contain rewritten hyperlink 314. In various cases and embodiments, support service request 300 and support service request 312 are the same entity, or otherwise comprise the same elements, except for the replacing of hyperlink 302 with rewritten hyperlink 314.

Figure 4:
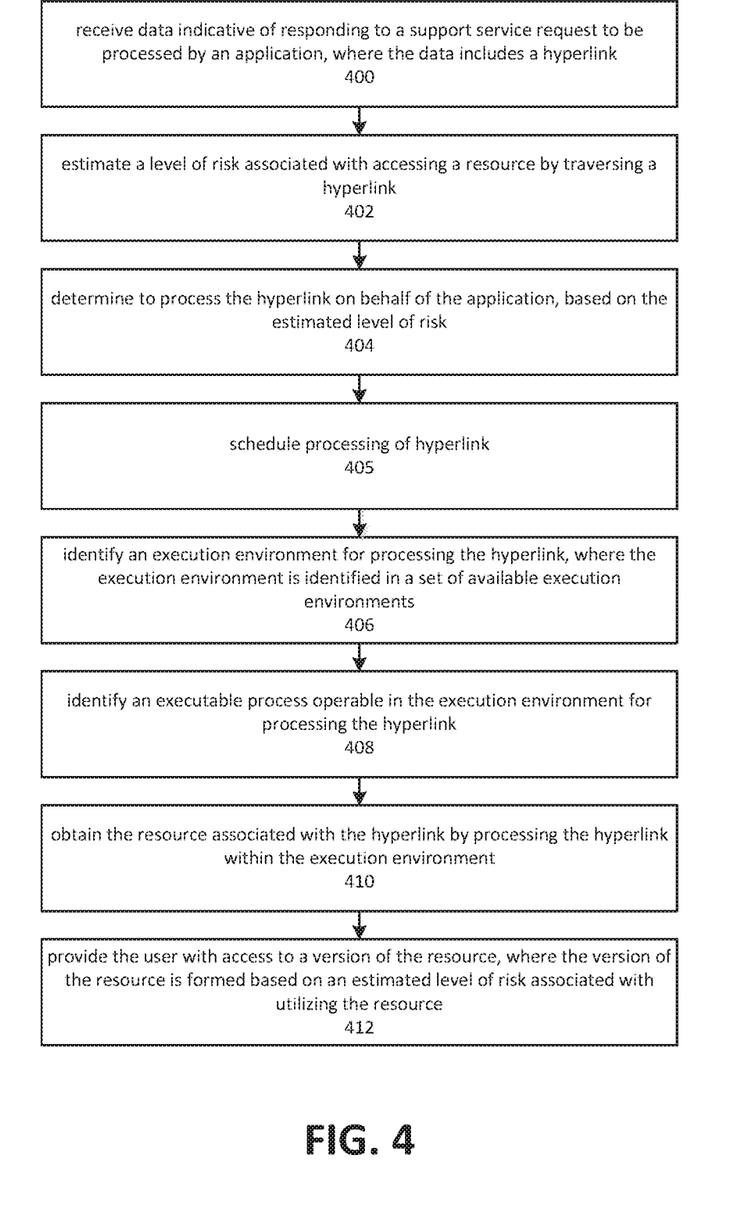
FIG. 4 is a flowchart depicting an embodiment of a process for providing a safe version of resources referred to by potentially unsafe hyperlinks.

FIG. 4 is a flowchart depicting an embodiment of a process for providing safe versions of resources referred to by potentially unsafe hyperlinks. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 400 depicts receiving data indicative of responding to a support service request. The data may be in the form of a support service request to be processed by a support service application. The data may contain a hyperlink referring to a resource located on the Internet or some other network location, and either the location or the resource may be associated with a level of risk. A user of the support service application may, however, wish to utilize the resource during the resolution of the support service request.

As noted, there may be risk associated with traversing a hyperlink to access a resource. Element 402 depicts estimating a level of risk associated with accessing a resource by traversing a hyperlink. Embodiments may, for example, perform a classification or quantification of a risk level.

Factors that may be considered include the domain associated with the hyperlink, comparison against whitelists and blacklists, identification of the resource ostensibly referred to by the hyperlink, and so forth.

As indicated by element 404, embodiments may determine to process the hyperlink on behalf of the support service application based at least partly on the estimated level of risk. Embodiments may apply the mechanisms for safely rendering versions of a hyperlinked resource to hyperlinks and resources whose risk level is above some threshold amount or who fall into certain categories of risk.

As depicted by element 405, embodiments may schedule processing of hyperlinks. A system for processing potentially unsafe hyperlinks may schedule processing so as to increase a probability that a safe version of the resource will be available when it is likely to be needed. For example, a support services application might be utilized by a number of users operating in different shifts—for example, a morning shift and an evening shift. Embodiments might assign a priority to potentially unsafe hyperlinks so that those links associated with the current shift are prioritized over those associated with an upcoming shift. Prioritization might be based on the individual schedule of a support services worker, for example. In some cases and embodiments, links associated with the same support services request might be given the same priority, or have their priorities adjusted, so that all of the links associated with a particular request are processed at close to the same time. These and other techniques may be used to set the priority for processing a potentially unsafe hyperlink based on a predicted time at which a safe version of the resource is expected to be used.

Element 406 depicts identifying an execution environment for processing the hyperlink. This operation may be performed in response to determining to process the hyperlink as depicted by element 404. The execution environment may be selected from a set of execution environments that are available for processing the hyperlink. For example, embodiments may maintain a pool of execution environments, from which execution environments may be drawn on an as-needed basis. As described herein, an execution environment may comprise a virtual machine and may also comprise a process such as a browser application operating within the virtual machine environment. A pool of such processes may be maintained on each virtual machine. Embodiments may base availability for processing a hyperlink on the availability of a virtual machine with at least one operating or operable process that is currently unused and available for processing a hyperlink.

Embodiments may select an execution environment based at least in part on obtaining an environment configured to have access controls that are sufficient to access the resource referred to by the hyperlink, but limited based on risk associated with accessing the hyperlink. For example, an execution environment could be configured with access controls sufficient to allow Internet access, but to deny access to the local file system or local network resources. If the level of risk is estimated to be low, greater amounts of access could be provided. If the level of risk is estimated to be high, further restrictions might be imposed. Embodiments may configure access controls for the execution environment to be a subset of those available to a support services application, so that the execution environment is configured to allow access to less than the set of resource available to the support services application.

Element 408 depicts identifying an executable process that is operating or operable in the execution environment for processing the hyperlink. This aspect may be combined with element 406 in cases where availability of the execution environment is associated with availability of an executable process for processing the hyperlink within the execution environment. Identification of the process may comprise transmitting data to the process, or to an associated proxy, indicating the hyperlink to be processed.

Embodiments may then, as depicted by element 410, obtain the resource associated with the hyperlink by processing the hyperlink within the execution environment. This may comprise operations such as opening communications channels over the network, transmitting hypertext transfer protocol ("HTTP") requests, receiving and storing the returned documents, and so on.

In some embodiments, obtaining the resource may comprise a series of interactive operations between a browser process operating in the execution environment and a server associated with the hyperlink. For example, a series of web pages may be retrieved and links within each web page followed. This step may be performed by an automated process or may be guided by a user. The retrieved pages may be archived to form a version of the resource that may be provided at a later stage to a user of the support service application. The pages may be archived in their actual form or as captured bitmaps. For example, screen captures of the browser application may be obtained as stored in the archive in place of the hypertext markup language ("HTML") pages that were retrieved via the hyperlink.

As depicted by element 412, embodiments may provide applications and users of the applications with access to a version of the retrieved resource. The version of the resource that is provided may be based on an estimated level of risk associated with utilizing the resource. The estimated level of risk may be based on the risk level assessed as depicted by element 402. Various other elements may be considered, such as the type of resource that was retrieved. For example, a retrieved resource known to be a bitmap image might be made available in the same form, while a safe version of a resource that corresponds to an executable program might comprise a video capture of the program running within the execution environment.

Providing access to the version of the resource might include storing the safe version of the resource in a location that will be accessible to a user or application. Embodiments may also perform operations such as rewriting hyperlinks in original message to refer to the safe version of the resource.

Embodiments may identify a format in which to provide a safe version of the resource. The format may be based on various factors, including the level of risk associated with a particular format, a level of interactivity with the resource that is required, a level of confidence regarding the source of the resource, the computing environment in which the resource will be rendered, the computing environment in which the safe version will be accessed, and so on.

Figure 5:
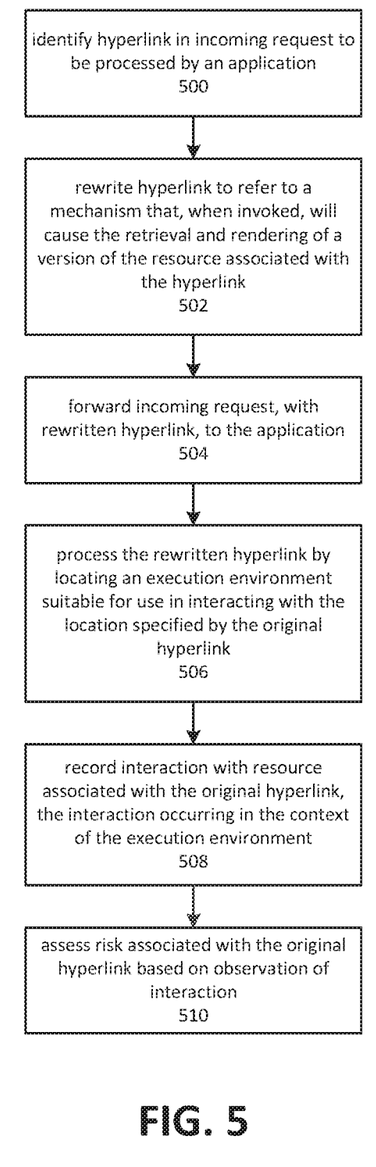
FIG. 5 is a flowchart depicting an embodiment of a process for performing and recording an interaction with a resource associated with a potentially unsafe hyperlink.

Embodiments of the present disclosure may also be performed to record interaction with the resource associated with the potentially unsafe hyperlink. FIG. 5 is a flowchart depicting an embodiment of a process for performing and recording interaction with a resource associated with a potentially unsafe hyperlink. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 500 depicts identifying a hyperlink that is embedded in data corresponding to an incoming request. The request may be directed to an application for processing. For example, a request may correspond to data describing a request to perform an action related to support service. Embodiments may perform various scanning functions on incoming data to determine if hyperlinks are present.

As depicted by element 502, embodiments may then perform operations to rewrite hyperlinks found in the incoming request. The link rewriting may be performed to refer to a mechanism that, when invoked, will cause a hyperlink to be retrieved and rendered, as described herein. The rewritten hyperlinks may be utilized, in various embodiments, as a trigger for the retrieval of potentially unsafe hyperlinks. A rewritten hyperlink may refer to a service interface that, when invoked, triggers the retrieval of a potentially unsafe hyperlink using an execution environment obtained for the retrieval, followed by a subsequent rendering of a safe version of the resource associated with the hyperlink.

The rewritten hyperlink may be forwarded, as part of the incoming request, to the application to which it was originally requested. This is depicted by element 504 of FIG. 5. The rewritten hyperlink may be displayed in the application with a visual indication that the link has been examined and may be followed. Embodiments may utilize visual cues to indicate that the link is safe to follow but that the associated resource has not yet been retrieved. In cases where the associated resource is retrieved in anticipation of processing the associated request, the rewritten hyperlink may be displayed with a visual indication that the link refers to a version of the associated resource that is known to be safe.

As depicted by element 506, the rewritten hyperlink may be processed by locating an execution environment that is suitable for use in interacting with the resource associated with the original hyperlink. The hyperlink may be processed in response to the link being activated in a support service application, in response to interaction with a user.

In some embodiments, the resource associated with a hyperlink may comprise a recorded interaction with the destination of the hyperlink. For example, processing a hyperlink may involve visiting a potentially unsafe location on the Internet and recording the interaction between a support service representative and that location. Element 506 depicts processing a hyperlink by locating an execution environment that would be suitable for use in interacting with the remote location and that would be capable of recording the interaction. An execution environment might, for example, comprise a virtual machine operating a browser application and a mechanism for recording a visual representation of pages displayed by the browser application. A support service representative might be able to interact with the virtual machine to control the browser application, even though the support service representative is primarily working through a support service application not operating in the context of the virtual machine that is running the browser. Element 508 depicts recording this interaction with the resource associated with the original hyperlink.

In various embodiments, recording interaction with the resource associated with an original, potentially unsafe hyperlink, as depicted by element 508, may comprise monitoring operations that may be used to determine risk levels associated with the resource. Interactions that may be monitored include operating system features, storage devices, network locations, and so on. Additional factors may be monitored or recorded, including virus scan results, file sizes, and so on. As depicted by element 510, embodiments may perform analysis based on the recorded interactions in order to assess risk associated with accessing the original hyperlink. For example, analysis might include determining if opening an attachment resulted in an attempt to access an unauthorized resource. Embodiments may store a record of the analysis indexed by a signature or hash of the hyperlink, the resource name, the domain name, and so on. In some cases, a resource may be manually examined and the results may be stored. A hash might be computed to identify a hyperlink determined to be unsafe based on an analysis of access patterns observed while accessing the resource in the execution environment. If a subsequent support services request refers to the same hyperlink, the hash might be used to quickly determine that the resource referred to by the hyperlink is unsafe.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
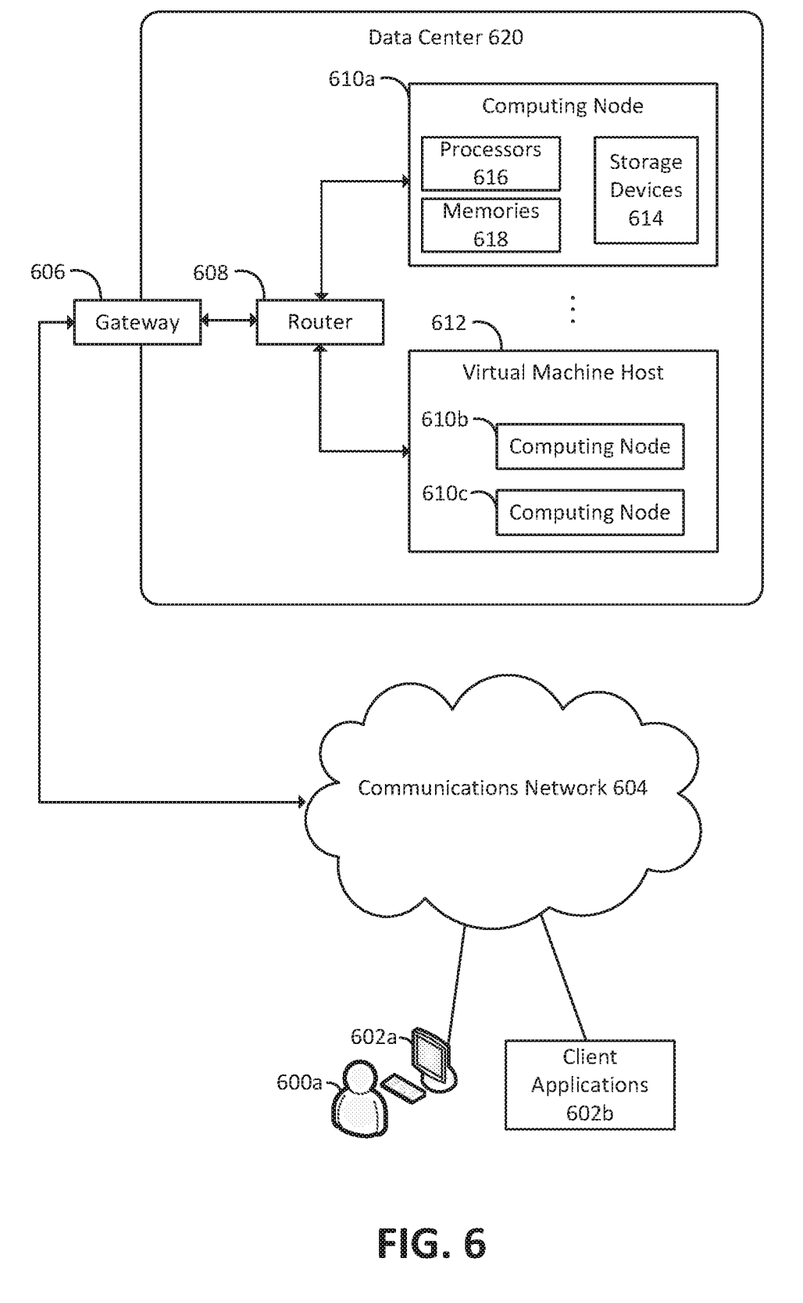
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600*a* may interact with various client applications, operating on any type of computing device 602*a*, to communicate over communications network 604 with processes executing on various computing nodes 610*a*, 610*b*, and 610*c* within a data center 620. Alternatively, client applications 602*b* may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610*a*, 610*b*, and 610*c*, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610*a*, 610*b*, and 610*c*. Some of these intermediate layers may themselves comprise processes executing on one or more of the computing nodes. Computing nodes 610*a*, 610*b*, and 610*c*, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
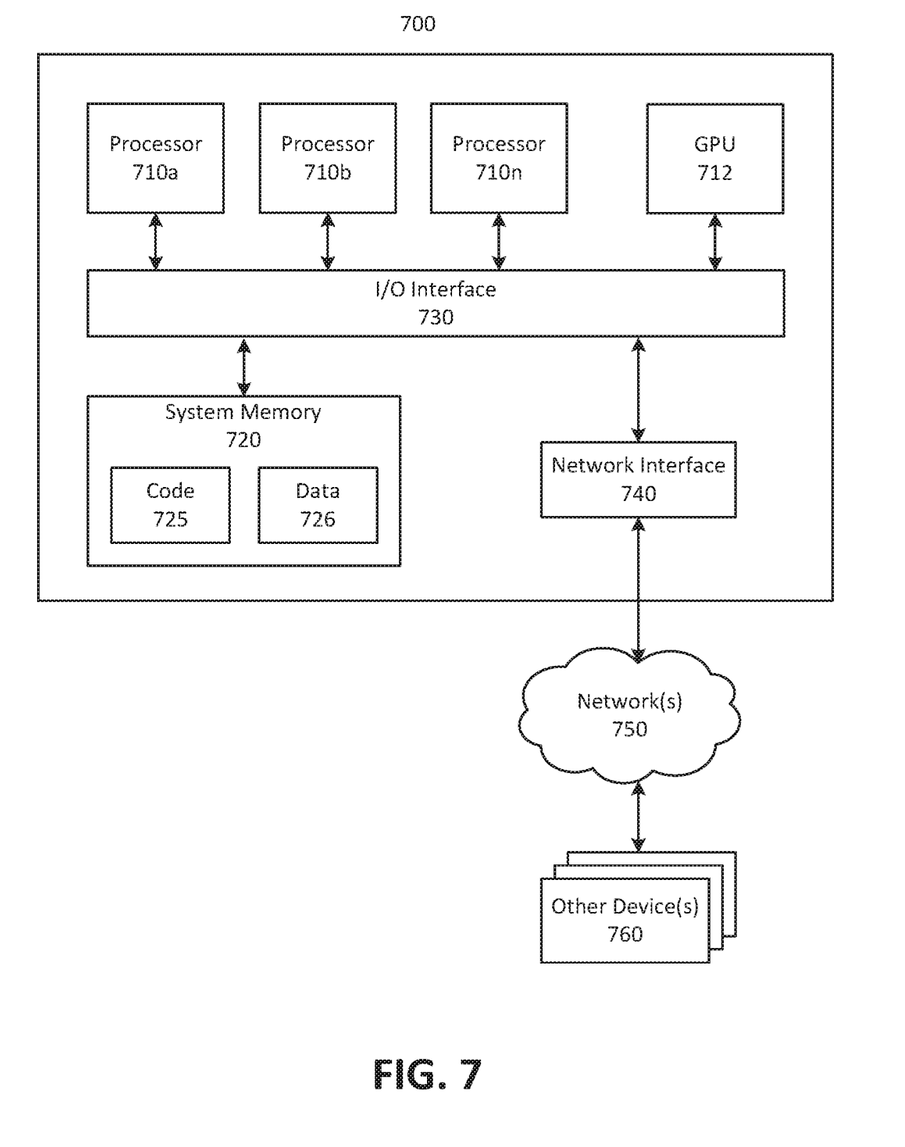
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 610. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 610). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method comprising:
   receiving from a first computing device a request to an application executing on a second computing device, the application having access rights to resources on the second computing device, the request comprising a first link referencing an external resource for use by the application, the external resource obtainable by processing the first link;
   determining to process the first link in an isolated execution environment based in part on a first estimated level of risk associated with processing the first link, the isolated execution environment having access controls sufficient to access the external resource and wherein the isolated execution environment obtains the external resource by processing the first link within the isolated execution environment; and
   providing the application with access to a version of the external resource usable by the application to respond to the request from the first computing device, the version provided being separate from the external resource.

2. The method of claim 1 wherein the first link comprises a reference to an external resource comprising at least one of a web page, a web service application programming interface, a file, a document, or a script.

3. The method of claim 1, wherein the version of the external resource is based at least in part on a second estimated level of risk associated with the external resource.

4. The method of claim 1, further comprising: forming the version of the external resource by storing a rendered version of the external resource within the execution environment.

5. The method of claim 1 wherein the isolated execution environment has limited access to resources available to other processes operating within an internal network.

6. The method of claim 1, further comprising:
   rewriting the first link to reference a safe version of the external resource for use by the application.

7. The method of claim 1, wherein the isolated execution environment comprises a virtual machine, the method further comprising:
  maintaining a plurality of virtual machine instances in operable states; and
  selecting a virtual machine instance of the plurality of virtual machine instances as the isolated execution environment for processing the first link.

8. A computing system comprising at least one processor in communication with at least one memory comprising computer-readable instructions that upon execution by the processor configure the processor at least to:
  receive data indicative of a request from a first computing device to an application executing on a second computing device, the application having access rights to resources on the second computing device, the indicative data comprising a first link referencing an external resource for use by the application, the external resource obtainable by processing the first link;
  determine to process the first link in an isolated execution environment based in part on a first estimated level of risk associated with processing the first link, the isolated execution environment having access controls sufficient to access the external resource and wherein the isolated execution environment obtains the external resource by processing the first link within the isolated execution environment; and
  provide the application with access to a version of the external resource usable by the application to respond to the request from the first computing device, the version provided being separate from the external resource.

9. The computing system of claim 8 wherein the first link comprises a reference to external resource comprising at least one of a web page, a web service application programming interface, a file, or a script.

10. The computing system of claim 8, wherein the version of the external resource is based at least in part on a second estimated level of risk associated with the external resource.

11. The computing system of claim 8, the at least one processor is further configured by the computer-readable instructions at least to: form the version of the external resource by storing a rendered version of the external resource within the isolated execution environment.

12. The computing system of claim 8 wherein the isolated execution environment has limited access to resources available to other processes operating within an internal network.

13. The computing system of claim 8, the at least one processor is further configured by the computer-readable instructions at least to:
  rewriting the first link to reference a safe version of the external resource for use by the application.

14. The computing system of claim 8, wherein the isolated execution environment comprises a virtual machine, the at least one processor further configured at least to:
  maintain a plurality of virtual machine instances in operable states; and
  select a virtual machine instance of the plurality of virtual machine instances as the isolated execution environment for processing the first link.

15. A non-transitory computer-readable medium having stored therein computer-executable instructions that upon execution cause the operations comprising:
  receiving data indicative of a request from a first computing device to an application executing on a second computing device, the application having access rights to resources on the second computing device, the indicative data comprising a first link referencing an external resource for use by the application, the external resource obtainable by processing the first link;
  determining to process the first link in an isolated execution environment based in part on a first estimated level of risk associated with processing the first link, the isolated execution environment having access controls sufficient to access the external resource and wherein the isolated execution environment obtains the external resource by processing the first link within the isolated execution environment; and
  providing the application with access to a version of the external resource usable by the application to respond to the request from the first computing device, the version provided being separate from the external resource.

16. The non-transitory computer-readable medium of claim 15, wherein the first link comprises a reference to external resource comprising at least one of a web page, a web service application programming interface, a file, or a script.

17. The non-transitory computer-readable medium of claim 15, wherein the version of the external resource is based at least in part on a second estimated level of risk associated with the external resource.

18. The non-transitory computer-readable medium of claim 15, the at least one processor further configured at least to: form the version of the external resource by storing a rendered version of the resource within the isolated execution environment.

19. The non-transitory computer-readable medium of claim 15, wherein the isolated execution environment has limited access to resources available to other processes operating within an internal network.

20. The non-transitory computer-readable medium of claim 15, wherein the isolated execution environment comprises a virtual machine, the at least one processor further configured at least to:
  maintain a plurality of virtual machine instances in operable states; and
  select a virtual machine instance of the plurality of virtual machine instances as the isolated execution environment for processing the first link.

* * * * *